US011958715B2

(12) United States Patent
Kawasaki

(10) Patent No.: US 11,958,715 B2
(45) Date of Patent: Apr. 16, 2024

(54) DRIVE MECHANISM, FIXING DEVICE, CONVEYING DEVICE, AND IMAGE FORMING APPARATUS

(71) Applicant: Ryohsuke Kawasaki, Kanagawa (JP)

(72) Inventor: Ryohsuke Kawasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 483 days.

(21) Appl. No.: 17/175,844

(22) Filed: Feb. 15, 2021

(65) Prior Publication Data

US 2021/0261367 A1 Aug. 26, 2021

(30) Foreign Application Priority Data

Feb. 21, 2020 (JP) ................................. 2020-028301

(51) Int. Cl.

*B65H 5/06* (2006.01)
*B65H 3/06* (2006.01)
*B65H 7/00* (2006.01)
*G03G 15/00* (2006.01)

(52) U.S. Cl.

CPC ............... *B65H 7/00* (2013.01); *B65H 5/062* (2013.01); *G03G 15/6529* (2013.01); *G03G 15/80* (2013.01); *B65H 2403/92* (2013.01); *B65H 2403/94* (2013.01); *B65H 2513/10* (2013.01); *B65H 2801/06* (2013.01); *G03G 2215/00679* (2013.01)

(58) Field of Classification Search

CPC .......... B65H 5/062; B65H 5/068; B65H 5/06; B65H 243/944; B65H 243/92; B65H 243/94; B65H 243/943; B65H 3/0669; B65H 2515/70; B65H 2555/25; B65H 2555/26; B65H 2555/24; B65H 2403/944; B65H 2403/92; B65H 2403/94; B65H 2403/943; G03G 2215/00679

See application file for complete search history.

(56) References Cited

U.S. PATENT DOCUMENTS

| | | | | |
|---|---|---|---|---|
| 2018/0334342 A1* | 11/2018 | Miyajima | ................ | B65H 7/00 |
| 2019/0127168 A1* | 5/2019 | Miyajima | ................ | B65H 5/06 |
| 2019/0152733 A1* | 5/2019 | Miyajima | ............. | B65H 5/062 |
| 2019/0386590 A1 | 12/2019 | Koike | | |

(Continued)

FOREIGN PATENT DOCUMENTS

| | | |
|---|---|---|
| JP | 2010-078083 A | 4/2010 |
| JP | 2018-117410 A | 7/2018 |

(Continued)

OTHER PUBLICATIONS

Japanese Office Action dated Oct. 19, 2023 for corresponding Japanese Patent Application No. 2020-028301.

*Primary Examiner* — Luis A Gonzalez

(74) *Attorney, Agent, or Firm* — Harness, Dickey & Pierce, P.L.C.

(57) ABSTRACT

A drive mechanism that drives a rotator to rotate includes a main motor, an assist motor, and processing circuitry. The main motor drives the rotator. The assist motor drives the rotator and assists a drive of the rotator by the main motor. The processing circuitry controls a speed of the main motor so that a rotational speed of the rotator is constant, and controls a motor voltage of the assist motor so that the motor voltage of the assist motor changes according to a change in a motor current of the main motor.

10 Claims, 5 Drawing Sheets

(56) References Cited

U.S. PATENT DOCUMENTS

| | | | | |
|---|---|---|---|---|
| 2020/0103811 | A1* | 4/2020 | Sugiyama | B65H 3/0669 |
| 2021/0132536 | A1* | 5/2021 | Koizumi | G03G 15/0189 |
| 2022/0190753 | A1* | 6/2022 | You | F16H 59/40 |

FOREIGN PATENT DOCUMENTS

| | | | |
|---|---|---|---|
| JP | 2018-193178 | | 12/2018 |
| JP | 2019-081618 | A | 5/2019 |
| JP | 2019-216558 | A | 12/2019 |
| JP | 2020-024272 | A | 2/2020 |

* cited by examiner

DRIVE MECHANISM, FIXING DEVICE, CONVEYING DEVICE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2020-028301, filed on Feb. 21, 2020, in the Japan Patent Office, the entire disclosure of which is incorporated by reference herein.

BACKGROUND

Technical Field

Aspects of the present disclosure relate to a drive mechanism rotating a rotator, a fixing device including the drive mechanism, a conveying device including the drive mechanism, and an image forming apparatus such as a copying machine, a printer, a facsimile machine, or a multifunction peripheral of the foregoing machines.

Related Art

There is known an image forming apparatus such as a copier or a printer that includes a drive mechanism to rotationally drive a rotator with two motors.

SUMMARY

In an aspect of the present disclosure, there is provided a drive mechanism that drives a rotator to rotate including a main motor, an assist motor, and processing circuitry. The main motor drives the rotator. The assist motor drives the rotator and assists a drive of the rotator by the main motor. The processing circuitry controls a speed of the main motor so that a rotational speed of the rotator is constant, and controls a motor voltage of the assist motor so that the motor voltage of the assist motor changes according to a change in a motor current of the main motor.

In other aspects of the present disclosure, there are provided a fixing device, a conveying device, and an image forming apparatus that include the drive mechanism.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
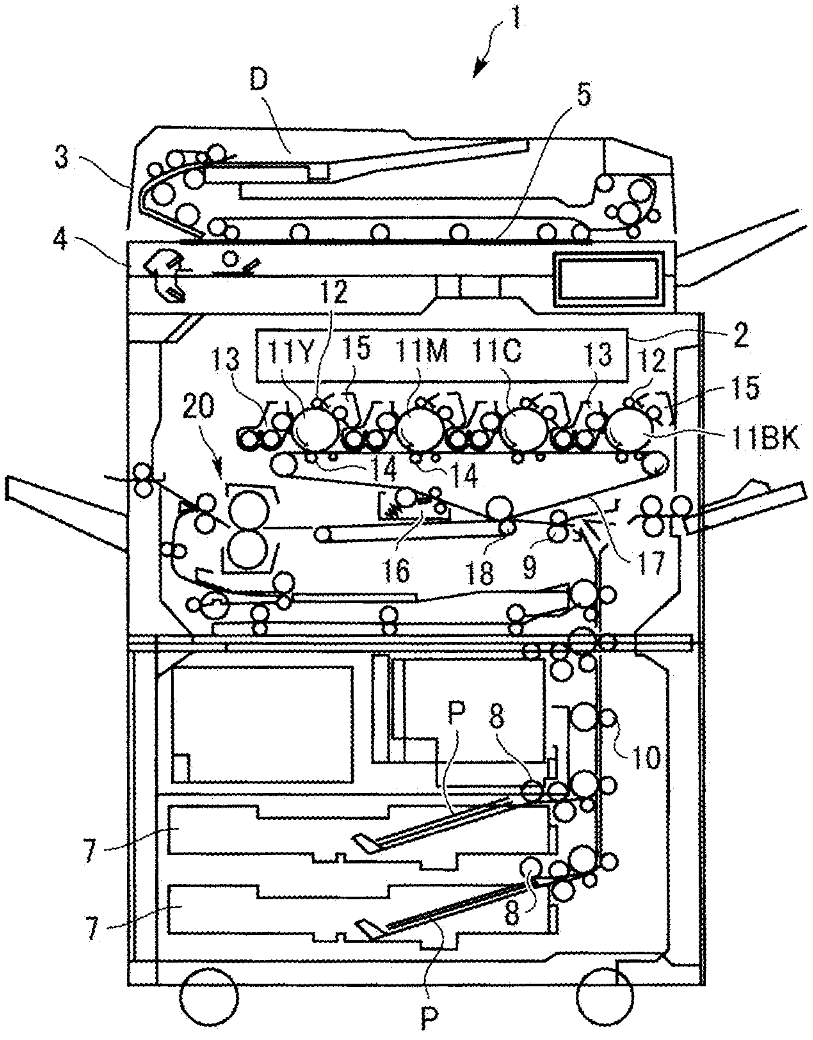
FIG. 1 is a schematic view illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Initially with reference to FIG. 1, a configuration and operation of an image forming apparatus 1 according to an embodiment of the present disclosure is described below. In FIG. 1, the image forming apparatus 1, which is a tandem-type color copier in the present embodiment, includes a writing device 2, a document conveying unit 3, and a scanner 4 (serving as a document reading unit). The writing device 2 emits a laser beam based on input image data. The document conveying unit 3 conveys a document D to the scanner 4. The scanner 4 reads image data of the document D. The image forming apparatus 1 further includes a sheet feeder unit 7 (in this case, a plurality of the sheet feeder units 7), a registration roller pair 9 (also referred to as a timing roller pair), and four drum-shaped photoconductor drums 11Y, 11M, 11C, and 11BK. The sheet feeder unit 7 accommodates sheets P such as paper sheets. The registration roller pair 9 adjusts a conveyance timing of a sheet P. The photoconductor drums 11Y, 11M, 11C, and 11BK bear toner images of yellow, magenta, cyan, and black, respectively.

The image forming apparatus 1 also includes chargers 12, developing units 13, primary transfer rollers 14, and cleaning units 15. Electrostatic latent images are formed on surfaces of the photoconductor drums 11Y, 11M, 11C, and 11BK, and developed into toner images of yellow, magenta, cyan, and black by the developing units 13. The toner images on the surfaces of the photoconductor drums 11Y, 11M, 11C, and 11BK are transferred to and superimposed on the intermediate transfer belt 17 by the primary transfer rollers 14. Residual (untransferred) toner is collected from the surfaces of the photoconductor drums 11Y, 11M, 11C, and 11BK by the cleaning units 15. The image forming apparatus 1 further includes a cleaning unit 16, an intermediate transfer belt 17, a secondary transfer roller 18, and a fixing device 20. The cleaning unit 16 cleans the intermediate transfer belt 17. The intermediate transfer belt 17 bears different colors of toner images superimposed one atop another. The secondary transfer roller 18 transfers the toner image from the intermediate transfer belt 17 onto the sheet P as a multicolor toner image. The fixing device 20 fixes the toner image (unfixed toner image) onto the sheet P.

A description is provided below of an operation of a normal color image forming of the image forming apparatus 1. The document conveying unit 3 conveys, with conveying rollers, the document D from a document table onto an exposure glass 5 of the scanner 4. The scanner 4 optically reads the image data of the document D set on the exposure glass 5. The yellow, magenta, cyan, and black image data are transmitted to the writing device 2. The writing device 2 emits laser beams (e.g., exposure light) onto the surfaces of the photoconductor drums 11Y, 11M, 11C, and 11BK according to the image data of yellow, magenta, cyan, and black, respectively.

Each of the four photoconductor drums 11Y, 11M, 11C, and 11BK rotates counterclockwise in FIG. 1. The chargers 12 disposed opposite the photoconductor drums 11Y, 11M, 11C, and 11BK uniformly charge the outer circumferential surfaces of the photoconductor drums 11Y, 11M, 11C, and 11BK, respectively (a charging process). Thus, a charging potential is formed on the surface of each of the photoconductor drums 11Y, 11M, 11C, and 11BK. Thereafter, the charged surface of each of the photoconductor drums 11Y, 11M, 11C, and 11BK reaches an irradiation position to be irradiated with a laser beam from the writing device 2 (an exposure process). In detail, four light sources of the writing device 2 emit laser beams according to the image data of yellow, magenta, cyan, and black. Each laser beam passes through a different optical path for each color component of yellow, magenta, cyan, and black.

The laser beam corresponding to the yellow component irradiates the outer circumferential surface of the first photoconductor drum 11Y from the left in FIG. 1. A polygon mirror that rotates at high velocity deflects the laser beam for yellow along the axis of rotation of the photoconductor drum 11Y (i.e., main scanning direction) so that the laser beam scans the surface of the photoconductor drum 11Y. Thus, an electrostatic latent image corresponding to the image data of yellow is formed on the photoconductor drum 11Y charged by the charger 12. Similarly, the laser beam corresponding to the magenta component irradiates the outer circumferential surface of the second photoconductor drum 11M from the left in FIG. 1, forming an electrostatic latent image corresponding to the magenta component. The laser beam corresponding to the cyan component irradiates the outer circumferential surface of the third photoconductor drum 11C from the left in FIG. 1, forming an electrostatic latent image corresponding to the cyan component. The laser beam corresponding to the black component irradiates the outer circumferential surface of the fourth photoconductor drum 11BK from the left in FIG. 1, forming an electrostatic latent image corresponding to the black component.

Thereafter, the surface of each of the photoconductor drums 11Y, 11M, 11C, and 11BK bearing the electrostatic latent image reaches a developing position opposite the developing unit 13. The developing units 13 supply toner of the respective colors onto the photoconductor drums 11Y, 11M, 11C, and 11BK and develop the electrostatic latent images on the surfaces of the photoconductor drums 11Y, 11M, 11C, and 11BK into visible toner images (a development process). After the development process, the surfaces of the photoconductor drums 11Y, 11M, 11C, and 11BK reach positions facing the intermediate transfer belt 17. The primary transfer rollers 14 are disposed at positions where the photoconductor drums 11Y, 11M, 11C, and 11BK face the intermediate transfer belt 17 and in contact with an inner circumferential surface of the intermediate transfer belt 17. At the positions of the primary transfer rollers 14, the respective toner images on the surfaces of the photoconductor drums 11Y, 11M, 11C, and 11BK are sequentially transferred and superimposed onto the intermediate transfer belt 17 (a primary transfer process).

After the primary transfer process, the surfaces of the respective photoconductor drums 11Y, 11M, 11C, and 11BK reach cleaning positions opposite the respective cleaning units 15. The cleaning units 15 remove and collect the residual (untransferred) toner from the outer circumferential surfaces of the photoconductor drums 11Y, 11M, 11C, and 11BK (a cleaning process). Thereafter, the outer circumferential surfaces of the photoconductor drums 11Y, 11M, 11C, and 11BK pass through dischargers to complete a series of image forming processes performed on the photoconductor drums 11Y, 11M, 11C, and 11BK.

On the other hand, the multicolor toner image is formed on the intermediate transfer belt 17 by transferring and superimposing the respective single-color toner images on the photoconductor drums 11Y, 11M, 11C, and 11BK. Then, the intermediate transfer belt 17 bearing the multicolor toner image moves clockwise in FIG. 1 to reach a position opposite the secondary transfer roller 18. The multicolor toner image borne on the intermediate transfer belt 17 is transferred onto the sheet P at the position facing the secondary transfer roller 18 (a secondary transfer process). Thereafter, the outer circumferential surface of the intermediate transfer belt 17 reaches a cleaning position opposite the cleaning unit 16. The cleaning unit 16 collects untransferred toner adhering to the intermediate transfer belt 17 to complete a series of transfer processes performed on the intermediate transfer belt 17.

The sheet P is conveyed from the sheet feeder unit 7 via the registration roller pair 9 to a secondary transfer nip between the intermediate transfer belt 17 and the secondary transfer roller 18. In detail, a feed roller 8 feeds the sheet P from the sheet feeder unit 7 that accommodates multiple sheets P, and the sheet P is conveyed to the registration roller pair 9 through a conveyance passage. The sheet P that has reached the registration roller pair 9 is conveyed toward the secondary transfer nip, timed to coincide with the arrival of the multicolor toner image on the intermediate transfer belt 17.

A conveyance belt conveys the sheet P, on which the multicolor toner image, in other words, a full-color image has been transferred, to a fixing device 20. The fixing device 20 fixes the multicolor image (toner image T) onto a surface of the sheet P at a nip area (a fixing nip) between a fixing roller 21 and a pressure roller 22 (a fixing process). After the fixing process, an output roller pair ejects the sheet P as an output image outside a main body of the image forming apparatus 1 to complete a series of image forming processes (a print operation).

Figure 2:
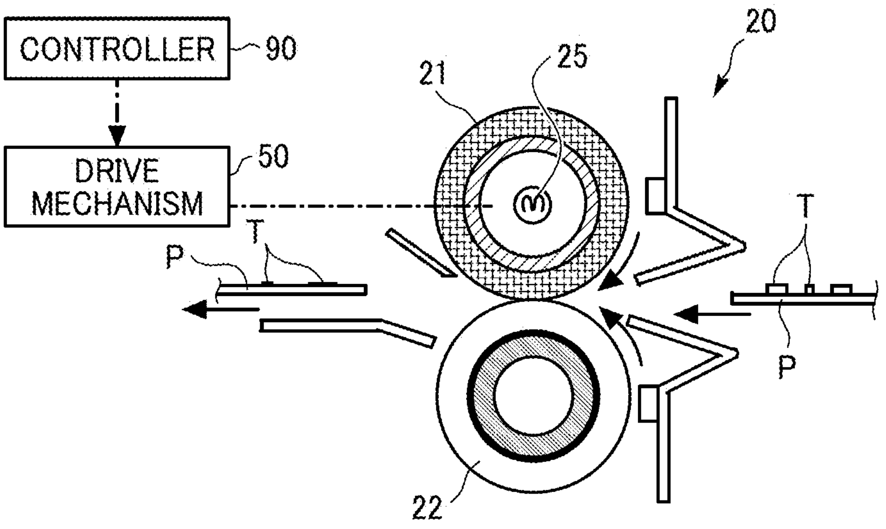
FIG. 2 is a schematic view illustrating a configuration of a fixing device according to an embodiment of the present disclosure.

Referring to FIG. 2, a description is provided of a configuration and operation of the fixing device 20 incorporated in the main body of the image forming apparatus 1. As illustrated in FIG. 2, the fixing device 20 includes the fixing roller 21 as a fixing rotator, a rod-shaped heater 25 (serving as a heating member), the pressure roller 22 as a pressure rotator, and so forth. The fixing roller 21 as a fixing rotator is a roller member of a multi-layered structure in which an elastic layer and a release layer are overlaid on a core metal, and is pressed against the pressure roller 22 as a pressure member to form a nip portion (a fixing nip). The fixing roller

21 is rotationally driven clockwise in FIG. 2 by the drive mechanism 50, which is controlled by a controller 90 serving as processing circuitry. The drive mechanism 50 is described in detail later. The rod-shaped heater 25 is stationarily disposed inside the fixing roller 21 having a hollow structure. The controller 90 causes the heater 25 to output radiation heat to heat the fixing roller 21, and then, the heated fixing roller 21 applies heat to the toner image T on the sheet P. The output of the heater 25 is controlled based on a surface temperature of the fixing roller 21, and the temperature is detected by a temperature sensor 40 facing the surface of the fixing roller 21 in a non-contact manner. The pressure roller 22 as a pressure member is a roller member having an elastic layer on a core metal, and is driven and rotated in the counterclockwise direction in FIG. 2 with respect to the rotation of the fixing roller 21.

In response to a print command (a print request), the drive mechanism 50 starts rotating the fixing roller 21 clockwise in FIG. 2, and the pressure roller 22 starts rotating counterclockwise in FIG. 2 in accordance with the clockwise rotation of the fixing roller 21. Thereafter, the sheet P is conveyed from the sheet feeder unit 7, and the toner image T is transferred from the intermediate transfer belt 17 onto the sheet P at the position of the secondary transfer roller 18. Thus, the sheet P bears the toner image T as an unfixed toner image. As illustrated in FIG. 2, the sheet P bearing the unfixed image (toner image T) is conveyed in a direction indicated by arrow in FIG. 2, and enters the fixing nip between the fixing roller 21 and the pressure roller 22 pressed against the fixing roller 21. The toner image T is fixed onto a surface of the sheet P under heat from the fixing roller 21 and pressure exerted from the fixing roller 21 and the pressure roller 22. Thereafter, the sheet P, on which the toner image T is fixed, is conveyed from the fixing nip in the direction indicated by an arrow in FIG. 2 according to the rotation of the fixing roller 21 and the pressure roller 22.

The configuration and operation of the drive mechanism 50, which is characteristic of the fixing device 20 (image forming apparatus 1) in the present embodiment, will be described in detail below. As described above with reference to FIG. 2, the image forming apparatus 1 includes the fixing device 20 to fix the toner image T borne on the sheet P and the drive mechanism 50 to drive the fixing device 20. In detail, in the fixing device 20, the fixing roller 21 as a fixing rotator is driven by an output gear 65 (driving gear) as the rotator of the drive mechanism 50, and rotates in the direction indicated by arrows in FIGS. 2 and 3. The pressure roller 22 as a pressure rotator is rotated with the rotation of the fixing roller 21.

Figure 3:
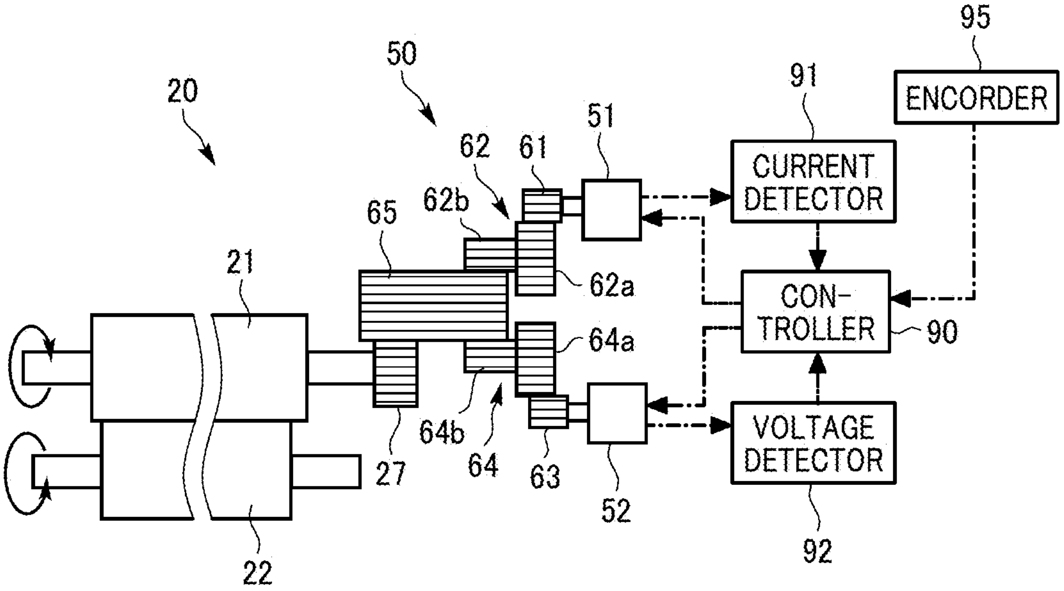
FIG. 3 is a schematic view illustrating a configuration of a drive mechanism according to an embodiment of the present disclosure.
Figure 4:
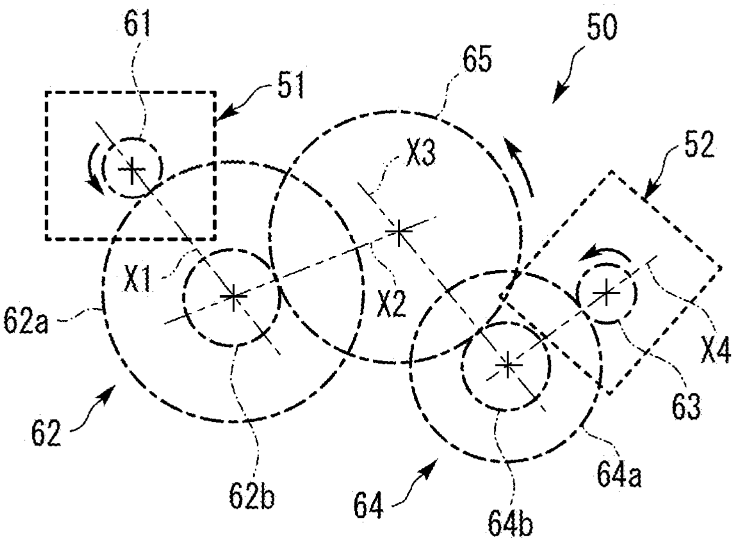
FIG. 4 is a schematic view of an arrangement of gears of the drive mechanism.

The drive mechanism 50 rotationally drives the output gear 65 as a rotator. In particular, in the present embodiment, the fixing roller 21 is rotationally driven by the output gear 65 of the drive mechanism 50. Thus, it can be said that the fixing roller 21 is rotationally driven by the drive mechanism 50. As illustrated in FIGS. 3 and 4, the drive mechanism 50 in the present embodiment includes a main motor 51 that drives the output gear 65 (rotator) and an assist motor 52 that assist the drive of the output gear 65 (rotator) by the main motor 51 to drive the output gear 65. In other words, the two motors (i.e., the main motor 51 and the assist motor 52) are arranged to rotationally drive the output gear 65.

As illustrated in FIGS. 3 and 4, the drive mechanism 50 includes, as drive transmission rotators, a plurality of gears (a gear train consisting of a first motor gear 61, a first idler two-stage gear 62, a second motor gear 63, and a second idler two-stage gear 64) that transmit drive to the output gear 65 from the main motor 51 and the assist motor 52.

The first motor gear 61 is disposed on a motor shaft of the main motor 51 and rotated in the counterclockwise direction in FIG. 3 with the motor shaft. The first idler two-stage gear 62 has a first small-diameter idler gear **62*b* and a first large-diameter idler gear 62*a* stacked in a stepped manner. The diameter (reference circle diameter) of the first large-diameter idler gear 62*a* is set larger than the diameter of the first small-diameter idler gear 62*b*. The first large-diameter idler gear 62*a* meshes with the first motor gear 61 of the main motor 51, and the first small-diameter idler gear 62*b* meshes with the output gear 65. Therefore, the output gear 65 is rotationally driven in the counterclockwise direction in FIG. 3 by the drive from the main motor 51. The first idler two-stage gear 62** functions as a deceleration mechanism.

The second motor gear 63 is disposed on a motor shaft of the assist motor 52 and rotated in the counterclockwise direction in FIG. 3 with the motor shaft. The second idler two-stage gear 64 has a second small-diameter idler gear **64*b* and a second large-diameter idler gear 64*a* stacked in a stepped manner. The diameter (reference circle diameter) of the second large-diameter idler gear 64*a* is set larger than the diameter of the second small-diameter idler gear 64*b*. The second large-diameter idler gear 64*a* meshes with the second motor gear 63 of the assist motor 52, and the second small-diameter idler gear 64*b* meshes with the output gear 65. Therefore, the output gear 65 is rotationally driven in the counterclockwise direction in FIG. 3 by the drive from the assist motor 52 (auxiliary driving). The second idler two-stage gear 64** functions as a deceleration mechanism.

The output gear 65 as a rotator meshes with each of the first small-diameter idler gear **62*b* and the second small-diameter idler gear 64*b*. In the present embodiment, the output gear 65 is an idler gear and meshes with a driven gear 27 (see FIG. 3) disposed on a shaft portion of the fixing roller 21. The output gear 65 meshes with and detaches from the driven gear 27 in association with the attachment operation and the detachment operation (in other words, the attachment operation and the detachment operation along a direction perpendicular to a plane on which FIG. 1 or 2 is illustrated, i.e., the left-and-right direction in FIG. 3) of the fixing device 20 to the image forming apparatus 1. Each of the first idler two-stage gear 62, the second idler two-stage gear 64, and the output gear 65 is rotatably held on a stud perpendicularly fixed on a frame of the drive mechanism 50**.

In the present embodiment, the speed of the main motor 51 is controlled (rotational speed control) so that the rotational speed of the output gear 65 (rotator) is constant. In detail, the target rotational speed of the main motor 51 is stored in the controller 90, and the main motor 51 is driven so that the target rotational speed is equal to the stored target rotational speed. The rotational drive of the main motor 51 is decelerated by the first idler two-stage gear 62 and transmitted to the output gear 65. The speed (rotational speed) of the main motor 51 is detected by an encoder 95 (i.e., a detector that detects the rotational speed of, e.g., the motor shaft of the main motor 51 or the output gear 65). Based on the detection result, the controller 90 adjusts the motor current (main motor current) of the main motor 51 so that the speed of the main motor 51 attains the target rotational speed.

In contrast, in the present embodiment, the assist motor 52 is voltage-controlled so that the motor voltage changes in response to the change of the motor current of the main motor 51. In detail, the main motor 51 is driven at a constant speed so as to attain the target rotational speed of the main motor 51, and the assist motor 52 is driven according to the rotational speed of the output gear 65 while the input motor voltage of the assist motor 52 is adjusted. The rotational drive of the assist motor 52 is decelerated by the second idler two-stage gear 64 and transmitted to the output gear 65.

In detail, when the motor current of the main motor 51 increases, the assist motor 52 is voltage-controlled so that the motor voltage increases. As described above, the motor current of the main motor 51 is adjusted so that the rotational speed of the main motor 51 attains the target rotational speed. The motor current is also adjusted when the load torque is changed. Specifically, when the load torque applied to the main motor 51 increases with the increase of the drive torque of the fixing roller 21, the controller 90 controls the main motor 51 so that the motor current becomes larger than when the load torque is small. In particular, since the fixing roller 21 is heated and thermally expanded by the heater 25 and the drive torque is changeable, the change of load torque of the main motor 51 is likely to occur. The change of the motor current of the main motor 51 is detected by a current detector 91, and the motor voltage of the assist motor 52 is controlled by the controller 90. Specifically, when the motor current of the main motor 51 becomes large, the motor voltage of the assist motor 52 is controlled so as to be larger than when the motor current is small. The motor voltage of the assist motor 52 is detected by a voltage detector 92 and fed back to the controller 90.

In other words, in the drive mechanism 50 according to the present embodiment, the assist amount of assisting the drive of the output gear 65 (rotator) by the main motor 51 is adjusted by the assist motor 52 according to the change in the load torque of the main motor 51. Specifically, when the load torque of the main motor 51 is large, the load torque of the main motor 51 needs to be reduced (in other words, the assist motor 52 needs to assist the drive of the output gear 65). Therefore, the assist amount by the assist motor 52 becomes larger. In contrast, when the load torque of the main motor 51 is small, the load torque of the main motor 51 does not need to be reduced. Therefore, the assist amount by the assist motor 52 becomes smaller.

Figure 5:
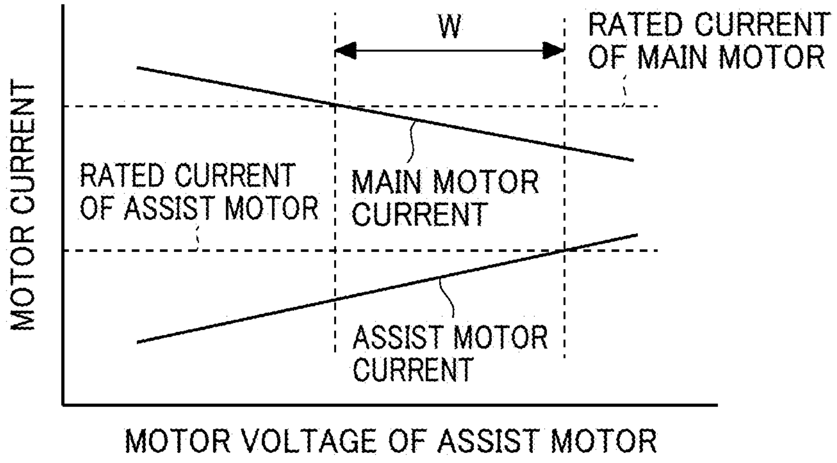
FIG. 5 is a graph illustrating a relationship between the motor voltage of an assist motor and the motor currents of two motors (a main motor and the assist motor)

As illustrated in FIG. 5, if the load of the output gear 65 (driving torque of the fixing device 20) is constant, the motor current of the main motor 51 is proportional to the motor voltage of the assist motor 52 with a negative inclination, and the motor current (assist motor current) of the assist motor 52 is proportional to the motor voltage of the assist motor 52 with a positive inclination. When the motor voltage of the assist motor 52 becomes large, the output exerted by the assist motor 52 becomes large. Therefore, the load (assist amount) that the assist motor 52 can bear becomes large. Since the motor current is considered to be the load of the motor, the motor current of the assist motor 52 increases as the motor voltage of the assist motor 52 increases. Accordingly, as the motor voltage of the assist motor 52 increases, the load torque of the main motor 51 decreases and the motor current of the main motor 51 decreases.

According to the present embodiment, the output gear 65 (or fixing device 20) is driven by the speed-controlled main motor 51 and the voltage-controlled assist motor 52. Thus, the load torque applied to the main motor 51 can be reduced, and the rotational speed of the output gear 65 (rotator) rotationally driven by the two motors (i.e., the main motor 51 and the assist motor 52) can be accurately maintained constant. In other words, if each of the two motors is speed-controlled, the respective speed controls may interfere (conflict) with each other, and it may be difficult to maintain the rotational speed of the output gear 65 (rotator) accurately and constantly. In contrast, in the present embodiment, although the main motor 51 is speed-controlled, the assist motor 52 is voltage-controlled so that the motor voltage is adjusted according to the change of the load torque of the main motor 51 in accordance with the rotational speed of the output gear 65. Thus, the above-described disadvantage is reduced.

According to the present embodiment, the output of the main motor 51 is larger than the output of the assist motor 52. That is, the assist motor 52 has a smaller power than the main motor 51. Since the assist motor 52 drives the output gear 65 (rotator) and assists the drive of the main motor 51, such a configuration allows cost reduction and downsizing of the overall drive mechanism 50.

Referring to FIG. 5, in the present embodiment, the reduction ratio (the reduction ratio of the second idler two-stage gear 64) in transmitting the drive from the assist motor 52 to the output gear 65 is determined so that an adjustment range W of the assist amount at which the assist motor 52 assists the drive of the output gear 65 (rotator) by the main motor 51 is equal to or larger than a predetermined width Wz (W≥Wz).

Each of the main motor 51 and the assist motor 52 has a rated current and needs to be driven at the rated current or less. If the load of the output gear 65 (driving torque of the fixing device 20) is constant, when the reduction ratio of the assist motor 52 (the reduction ratio of the second idler two-stage gear 64) is small, the range in which each of the main motor 51 and the assist motor 52 can be driven at the rated current or less is narrowed compared with when the reduction ratio is large. The larger the range, the larger the margin in which each of the main motor 51 and the assist motor 52 can be driven at the rated current or less, and the range becomes the adjustment range W in which the motor voltage of the assist motor 52 is available. The load torque of the assist motor 52 is transmitted via the second idler two-stage gear 64 (deceleration mechanism) with the load on the output gear 65 being smaller by the reduction ratio. Accordingly, when the reduction ratio of the assist motor 52 is large, the load torque of the assist motor 52 becomes smaller than when the reduction ratio is small. As a result, the motor current of the assist motor 52 becomes smaller, and the margin for the auxiliary drive is increased. Thus, the adjustment width of the assist amount can be set by the reduction ratio of the assist motor 52. On the other hand, the assist motor 52 has an output efficiency for the rotational speed, and it is desirable to use at a high efficiency. If the rotational speed of the output gear 65 is determined, the rotational speed of the assist motor 52 can be determined by the reduction ratio. Therefore, in consideration of the adjustment width and the output efficiency of the assist motor 52, the reduction ratio of the assist motor 52 is set so that the adjustment range W of the assist amount is not less than the predetermined width Wz.

As illustrated in FIG. 4, the rotation axis of the output gear 65 (rotator) and the rotation axis of the plurality of gears 62 to 64 (a plurality of the drive transmission rotators) are arranged so that the three rotation axes adjacent to each other are not on the same straight line when viewed in a cross section that is orthogonal to the rotation axes. Specifically, a virtual line X1 connecting the rotational axes of the first motor gear 61 and the first idler two-stage gear 62 intersects, without being on the same straight line, with respect to a virtual line X2 connecting the rotational axes of the first idler two-stage gear 62 and the output gear 65. Also, the virtual line X2 connecting the rotational axes of the first idler two-stage gear 62 and the output gear 65 intersects, without being on the same straight line, with respect to a virtual line X3 connecting the rotational axes of the output gear 65 and the second idler two-stage gear 64. Furthermore, the virtual line X3 connecting the rotational axes of the output gear 65 and the second idler two-stage gear 64 intersects, without being on the same straight line, with respect to a virtual line X4 connecting the rotational axes of the second idler two-stage gear 64 and the second motor gear 63. With such a configuration, compared to the case where three adjacent rotation axes are arranged on the same straight line, the force received by each gear can be dispersed in different directions, so that the studs holding the gears can be prevented from falling.

First Variation

Figure 6:
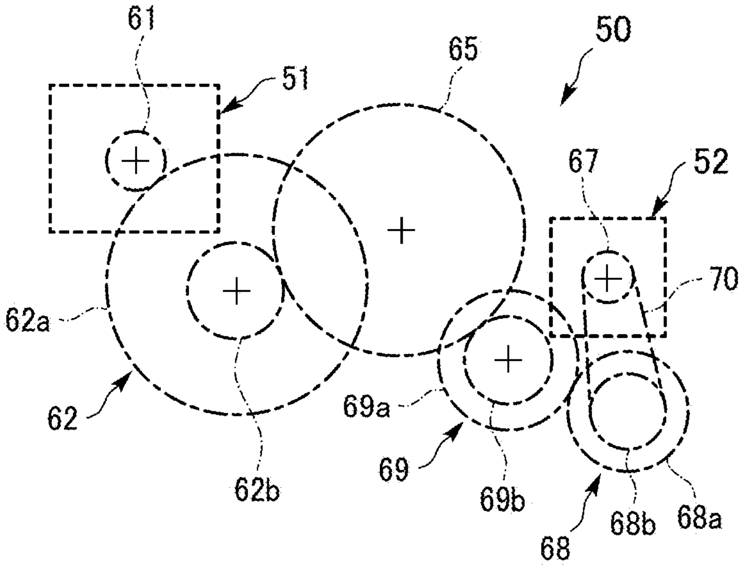
FIG. 6 is a schematic view illustrating an arrangement of gears of the drive mechanism according to a first variation.

As illustrated in FIG. 6, in the first variation, a timing belt 70 is used in addition to gears as the drive transmission rotators in the drive mechanism 50. In detail, as illustrated in FIG. 6, the drive mechanism 50 includes the first motor gear 61, the first idler two-stage gear 62, a motor pulley gear 67, an idler two-stage pulley gear 68, the timing belt 70, and the second idler two-stage gear 69. The first motor gear 61 is disposed on the motor shaft of the main motor 51 and rotated in the counterclockwise direction in FIG. 6 with the motor shaft. The first idler two-stage gear 62 has the first small-diameter idler gear 62*b* and the first large-diameter idler gear 62*a* stacked in a stepped manner. The diameter (reference circle diameter) of the first large-diameter idler gear 62*a* is set larger than the diameter of the first small-diameter idler gear 62*b*. The first large-diameter idler gear 62*a* meshes with the first motor gear 61 of the main motor 51, and the first small-diameter idler gear 62*b* meshes with the output gear 65. Accordingly, the output gear 65 is rotationally driven in the counterclockwise direction in FIG. 6 by the drive from the main motor 51. The first idler two-stage gear 62 functions as the deceleration mechanism.

In first variation, the motor pulley gear 67 is disposed on the motor shaft of the assist motor 52 and rotated in the counterclockwise direction in FIG. 6 with the motor shaft. The idler two-stage pulley gear 68 has a pulley gear 68*b* and an idler gear 68*a* stacked in a stepped manner. The diameter of the idler gear 68*a* is set larger than the diameter of the pulley gear 68*b*. The timing belt 70 is wound around the motor pulley gear 67 of the assist motor 52 and the pulley gear 68*b*. The second idler two-stage gear 69 has a second small-diameter idler gear 69*b* and a second large-diameter idler gear 69*a* stacked in a stepped manner. The diameter of the second large-diameter idler gear 69*a* is set larger than the diameter of the second small-diameter idler gear 69*b*. The second large-diameter idler gear 69*a* meshes with the idler gear 68*a* of the idler two-stage pulley gear 68, and the second small-diameter idler gear 69*b* meshes with the output gear 65. Therefore, the output gear 65 is rotationally driven in the counterclockwise direction in FIG. 3 by the drive from the assist motor 52. The second idler two-stage gear 69 and the idler two-stage pulley gear 68 function as the deceleration mechanism. Even with the configuration of the first variation, the rotational speed of the output gear 65 that is driven by the two motors (i.e., the main motor 51 and the assist motor 52) can be accurately maintained constant. In particular, in first variation, since the timing belt 70 is used as the driving transmitter of the drive mechanism 50, the assist motor 52 can be disposed in a position sufficiently away from the output gear 65 and the main motor 51. Therefore, the degree of freedom in the layout of the drive mechanism 50 is improved.

Second Variation

Figure 7:
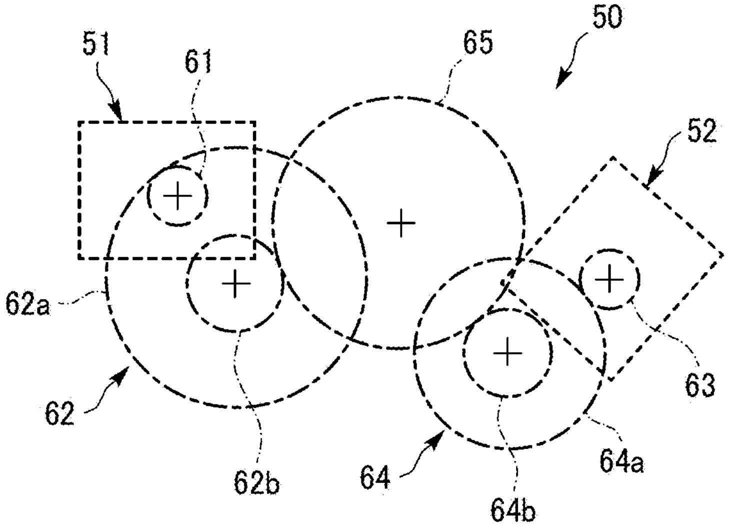
FIG. 7 is a schematic view illustrating an arrangement of gears of the drive mechanism according to a second variation.

As illustrated in FIG. 7, in the drive mechanism 50 in the second variation, the first large-diameter idler gear 62*a* of the first idler two-stage gear 62 has an internal gear shape instead of an external gear shape. Even with the configuration of the second variation, the rotational speed of the output gear 65 that is driven by the two motors (i.e., the main motor 51 and the assist motor 52) can be accurately maintained constant. In particular, in the second variation, since the first large-diameter idler gear 62*a* of the first idler two-stage gear 62 is the internal gear, the drive mechanism 50 can be downsized.

Third Variation

Figure 8:
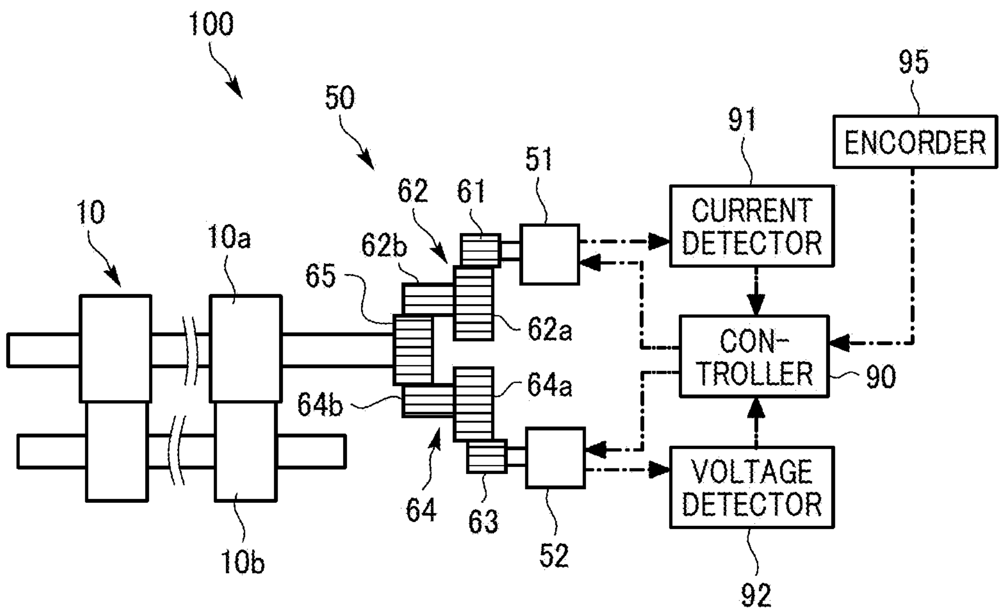
FIG. 8 is a schematic view illustrating the drive mechanism in a conveying device according to a third variation.3.

As illustrated in FIG. 8, the drive mechanism 50 in the third variation is disposed in a conveying device 100 that conveys the sheet P. As illustrated in FIG. 8, the conveying device 100 includes the conveying roller pair 10 (see FIG. 1) in which two conveying rollers (i.e., a driving roller 10*a* and a driven roller 10*b*) forms a nip. The output gear 65 is disposed on a shaft portion of the driving roller 10*a* of the conveying roller pair 10. With such a configuration, the two motors (i.e., the main motor 51 and the assist motor 52) rotate the output gear 65 (rotator), and the drive of the output gear 65 is transmitted to the driving roller 10*a* (conveying roller) to rotate the driving roller 10*a*. In particular, in the third variation, the driving roller 10*a* (conveying roller) is rotated together with the output gear 65. Even with the configuration of the third variation, the rotational speed of the output gear 65 that is driven by the two motors (main motor 51 and assist motor 52) can be accurately maintained constant.

As described above, the drive mechanism 50 according to the present embodiment includes the main motor 51 and the assist motor 52. The main motor 51 drives the output gear 65 (rotator). The assist motor 52 assists the drive of the output gear 65 by the main motor 51 to drive the output gear 65. The speed of the main motor 51 is controlled so that the rotational speed of the output gear 65 is constant. The assist motor 52 is voltage-controlled so that the motor voltage changes in response to the change of the motor current of the main motor 51. Thus, the rotational speed of the output gear 65 (rotator) driven by the two motors (i.e., the main motor 51 and the assist motor 52) can be accurately maintained constant.

It is to be noted that, in the present embodiment, the drive mechanism 50 is provided in the image forming apparatus 1 that performs full-color image formation. However, embodiments of this disclosure are not limited to such a drive mechanism in an image forming apparatus that performs full-color image formation. For example, a drive mechanism according to an embodiment of this disclosure may be provided in an image forming apparatus that performs monochrome image formation. Further, it is to be noted that, in the present embodiment, the drive mechanism 50 is provided in the image forming apparatus 1 that employs electrophotography. However, embodiments of this disclosure are not limited to such a drive mechanism provided in an image forming apparatus that employs electrophotography. For example, a drive mechanism according to an embodiment of this disclosure may be provided in an image forming apparatus that employs an inkjet method or a stencil printing machine. Furthermore, in the present embodiment, the fixing roller 21 (fixing rotator) is configured to be rotated by the output gear 65. However, in an embodiment of the present disclosure, the pressure roller 22 (pressure rotator) may be configured to be rotated by the drive transmitted from an output gear. In the present embodiment, the drive mechanism 50 is disposed in the fixing device 20 (or the conveying device 100). However, for example, a drive mechanism according to an embodiment of the present disclosure may be disposed in any other device than a fixing device or a conveying device. Moreover, in the present embodiment, the rotator driven by the drive mechanism 50 is the output gear 65. However, the rotator driven by the drive mechanism 50 is not limited to such an output gear. In some embodiments, the drive mechanism may rotate various types of rotators. In such configurations, similar effects to the above-described embodiments are also attained.

Note that embodiments of the present disclosure are not limited to the above-described embodiments and it is apparent that the above-described embodiments can be appropriately modified within the scope of the technical idea of the present disclosure in addition to what is suggested in the above-described embodiments. Further, the number, position, shape, and so forth of components are not limited to those of the present embodiment, and may be the number, position, shape, and so forth that are suitable for implementing the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A drive mechanism configured to drive a rotator to rotate, the drive mechanism comprising:

a main motor configured to drive the rotator;

an assist motor configured to drive the rotator and assist a drive of the rotator by the main motor; and processing circuitry configured to:

control a speed of the main motor so that a rotational speed of the rotator is constant; and control a motor voltage of the assist motor so that the motor voltage of the assist motor changes according to a change in a motor current of the main motor, wherein a reduction ratio in transmitting a drive from the assist motor to the rotator is a value such that an adjustment range of an assist amount of the assist motor assisting the drive of the rotator by the main motor is equal to or larger than a predetermined width.

2. The drive mechanism according to claim 1, wherein the processing circuitry is configured to control the motor voltage of the assist motor so that the motor voltage of the assist motor increases as the motor current of the main motor increases.

3. The drive mechanism according to claim 1, wherein the processing circuitry is configured to adjust the assist amount of the assist motor assisting the drive of the rotator by the main motor, according to a change in a load torque of the main motor.

4. The drive mechanism according to claim 1, wherein an output of the main motor is larger than an output of the assist motor.

5. The drive mechanism according to claim 1, further comprising:

a first motor gear disposed on a motor shaft of the main motor;

a first idler two-stage gear that includes a first small-diameter idler gear and a first large-diameter idler gear stacked one on another in a stepped manner, the first large-diameter idler gear meshing with the first motor gear;

a second motor gear disposed on a shaft of the assist motor;

a second idler two-stage gear that includes a second small-diameter idler gear and a second large-diameter idler gear stacked one on another in a stepped manner, the second large-diameter idler gear meshing with the second motor gear; and an output gear as the rotator meshing with the first small-diameter idler gear and the second small-diameter idler gear.

6. The drive mechanism according to claim 1, further comprising:

a first motor gear disposed on a motor shaft of the main motor;

a first idler two-stage gear that includes a first small-diameter idler gear and a first large-diameter idler gear stacked one on another in a stepped manner, the first large-diameter idler gear meshing with the first motor gear;

an idler two-stage pulley gear that includes a pulley gear and an idler gear stacked one on another in a stepped manner;

a motor pulley gear disposed on a motor shaft of the assist motor;

a timing belt wound around the motor pulley gear and the pulley gear;

a second idler two-stage gear that includes a second small-diameter idler gear and a second large-diameter idler gear stacked one on another in a stepped manner, the second large-diameter idler gear meshing with the idler gear of the idler two-stage pulley gear; and an output gear as the rotator meshing with the first small-diameter idler gear and the second small-diameter idler gear.

7. The drive mechanism according to claim 1, further comprising a plurality of drive transmission rotators configured to transmit drive from the main motor and the assist motor to the rotator, wherein a rotation axis of the rotator and rotation axes of the plurality of drive transmission rotators are arranged so that three rotation axes next to each other are not on a same straight line in a cross section that is orthogonal to the rotation axis of the rotator and the rotation axes of the plurality of drive transmission rotators.

8. A fixing device comprising:

a fixing rotator configured to fix a toner image on a sheet;

a pressure rotator; and the drive mechanism according to claim 1 including an output gear as the rotator to transmit drive to and rotate one of the fixing rotator and the pressure rotator.

9. A conveying device that conveys a sheet comprising:

a conveying roller configured to convey a sheet; and the drive mechanism according to claim 1 including an output gear as the rotator to transmit drive to and rotate the conveying roller.

10. An image forming apparatus comprising the drive mechanism according to claim 1.

* * * * *